United States Patent
Watt et al.

(10) Patent No.: US 10,190,662 B2
(45) Date of Patent: Jan. 29, 2019

(54) VARIATOR FOR WORK VEHICLE DRIVETRAIN

(71) Applicant: Deere & Company, Moline, IL (US)

(72) Inventors: Dwayne B. Watt, Bartlesville, OK (US); Cecil H. Wise, Jr., Coffeyville, KS (US); George W. Detrick, Coffeyville, KS (US)

(73) Assignee: Deere & Company, Moline, IL (US)

( * ) Notice: Subject to any disclaimer, the term of this patent is extended or adjusted under 35 U.S.C. 154(b) by 183 days.

(21) Appl. No.: 15/214,333

(22) Filed: Jul. 19, 2016

(65) Prior Publication Data
US 2018/0023671 A1    Jan. 25, 2018

(51) Int. Cl.
| | | |
|---|---|---|
| *A01D 69/02* | (2006.01) | |
| *F16H 3/72* | (2006.01) | |
| *A01D 69/00* | (2006.01) | |
| *A01D 69/06* | (2006.01) | |

(Continued)

(52) U.S. Cl.
CPC ............ *F16H 3/725* (2013.01); *A01D 69/002* (2013.01); *A01D 69/005* (2013.01); *A01D 69/02* (2013.01); *A01D 69/06* (2013.01); *B60K 25/02* (2013.01); *A01D 46/085* (2013.01); *B60K 2025/022* (2013.01); *B60K 2025/024* (2013.01); *B60Y 2200/22* (2013.01); *F16H 3/72* (2013.01); *F16H 3/724* (2013.01)

(58) Field of Classification Search
CPC . F16H 3/725; F16H 3/724; F16H 3/72; B60K 2025/022; B60K 25/02; B60K 2025/024; A01D 69/002; A01D 69/02; A01D 69/06

USPC ............ 475/5, 150, 219, 339, 340, 342, 332
See application file for complete search history.

(56) References Cited

U.S. PATENT DOCUMENTS

| | | | |
|---|---|---|---|
| 2,504,040 A | 4/1950 | Orshansky, Jr. | |
| 6,607,466 B2 * | 8/2003 | Bordini | B60K 6/365 |
| | | | 475/5 |

(Continued)

FOREIGN PATENT DOCUMENTS

| | | |
|---|---|---|
| DE | 112005003329 T5 | 5/2008 |
| DE | 102008008236 A1 | 8/2009 |

(Continued)

OTHER PUBLICATIONS

German Patent and Trade Mark Office, Search Report for German Patent Application No. 10 2017 210 188.1 dated Mar. 16, 2018.

(Continued)

*Primary Examiner* — Roger L Pang
(74) *Attorney, Agent, or Firm* — Klintworth & Rozenblat IP LLP (57) ABSTRACT

A high efficiency work vehicle drivetrain contains a variator having an inline dual planetary configuration. The work vehicle drivetrain includes an engine, an auxiliary power takeoff (PTO) shaft coupled to the engine and rotatable about a primary power path axis when driven by the engine, and the variator assembly. The variator assembly includes a variator motor and a variator gearbox. The variator gearbox contains a planetary gear system, which is coupled to the variator motor and to the auxiliary PTO shaft. The planetary gear system is rotatable about a planetary axis, which is coaxial with the primary power path axis.

15 Claims, 5 Drawing Sheets

(51) Int. Cl.
    *B60K 25/02*        (2006.01)
    *A01D 46/08*        (2006.01)

(56)            References Cited

U.S. PATENT DOCUMENTS

| | | | |
|---|---|---|---|
| 6,645,112 B1* | 11/2003 | Fleytman | B60K 17/3462 |
| | | | 180/249 |
| 6,666,787 B2* | 12/2003 | Doepke | B60K 6/365 |
| | | | 475/343 |
| 7,192,373 B2* | 3/2007 | Bucknor | B60K 6/365 |
| | | | 180/65.22 |
| 7,588,511 B2* | 9/2009 | Tangl | B60K 6/365 |
| | | | 475/150 |
| 7,609,011 B2* | 10/2009 | Yatabe | B60W 20/30 |
| | | | 180/65.285 |
| 8,241,170 B2* | 8/2012 | Gumpoltsberger | F16H 3/66 |
| | | | 475/275 |
| 8,454,467 B2* | 6/2013 | Meise | F16H 47/04 |
| | | | 475/339 |
| 8,663,051 B2* | 3/2014 | Sten | F16H 48/36 |
| | | | 475/150 |
| 8,839,694 B2 | 9/2014 | Detrick et al. | |
| 8,944,194 B2 | 2/2015 | Glaser et al. | |
| 9,206,885 B2 | 12/2015 | Rekow et al. | |
| 9,376,009 B2* | 6/2016 | Ono | B60K 6/365 |
| 9,975,424 B2* | 5/2018 | Krapf | B60K 17/28 |
| 2006/0148605 A1 | 7/2006 | Raghavan et al. | |
| 2014/0213404 A1* | 7/2014 | Schindler | B60K 6/445 |
| | | | 475/74 |
| 2014/0274527 A1* | 9/2014 | Sten | F16H 1/46 |
| | | | 475/150 |
| 2015/0183436 A1 | 7/2015 | Rekow et al. | |
| 2015/0239343 A1 | 8/2015 | Janasek et al. | |
| 2015/0292608 A1 | 10/2015 | McKinzie | |
| 2015/0300471 A1 | 10/2015 | Love et al. | |
| 2016/0153174 A1* | 6/2016 | Naito | B60K 6/40 |
| | | | 475/5 |
| 2018/0023672 A1* | 1/2018 | Watt | F16H 3/78 |
| | | | 74/15.4 |

FOREIGN PATENT DOCUMENTS

| | | | | |
|---|---|---|---|---|
| DE | 102012006189 A1 | 10/2013 | | |
| FR | 2981886 A1 * | 5/2013 | | B60K 6/00 |
| WO | 2006042434 A1 | 4/2006 | | |
| WO | 2013094029 A1 | 6/2013 | | |

OTHER PUBLICATIONS

German Patent and Trade Mark Office, Search Report for German Patent Application No. 10 2017 210 095.8 dated Mar. 15, 2018.

* cited by examiner

VARIATOR FOR WORK VEHICLE DRIVETRAIN

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to work vehicles and, more particularly, to high efficiency work vehicle drivetrains containing variator gearboxes.

BACKGROUND OF THE DISCLOSURE

Work vehicles may be equipped with specialized tools or work implements designed to perform tasks useful in the agricultural, forestry, construction, mining, and other industries. When powered by a rotating shaft, the work implements are referred to herein as "shaft-powered implements." Examples of work vehicles having shaft-powered implements include cotton and sugarcane harvesters. Such harvesters may be equipped with forward-mounted row units containing movable, shaft-powered components, which pick, strip, or otherwise collect cotton fiber as the harvester travels over a field. The shaft-powered implements may be driven by an infinitely variable power source, such as a hydrostatic drive. The hydrostatic drive may include a hydrostatic motor, which is mechanically linked to the shaft-powered implements through an auxiliary power take-off (PTO) shaft. By varying the output speed of the hydrostatic motor, the speed of the shaft-powered implements can be controlled. The ground speed of the work vehicle is further controlled utilizing a separate drivetrain, which may include a prime mover (e.g., internal combustion engine) linked to the ground wheels (or tracks) through a multi-speed transmission. Vehicle ground speed may thus be selected by varying the output speed of the engine or the gear ratio setting of the transmission, while the speed of the shaft-powered implements is independently adjusted to optimize implement performance. In the case of a cotton harvester, for example, the speed of the cotton stripper or picker units can be controlled to maximize the rate of cotton fiber collection independently of variations in the ground speed of the harvester.

SUMMARY OF THE DISCLOSURE

Embodiments of high efficiency work vehicle drivetrains containing variator assemblies are disclosed.

In one embodiment, the work vehicle drivetrain includes an engine, an auxiliary power takeoff (PTO) shaft coupled to the engine and rotatable about a primary power path axis, and a variator assembly. The variator assembly includes, in turn, a variator gearbox and a variator motor, such as an electric motor or a hydrostatic drive. The variator gearbox contains a planetary gear system, which is coupled to the variator motor and to the auxiliary PTO shaft. The planetary gear system is rotatable about a planetary axis, which is coaxial or inline with the primary power path axis.

Embodiments of a variator assembly are further provided. In one embodiment, the variator assembly includes a variator motor and a variator gearbox. The variator gearbox includes, in turn, a gearbox housing to which the variator motor is mounted. A variator input shaft extends into the gearbox housing and is rotatable with respect thereto about a primary power path axis. A planetary gear system, such as a dual planetary gear system, is disposed within the gearbox housing, coupled to the variator motor and to the variator input shaft, and rotatable about a planetary axis substantially coaxial with the primary power path axis. The variator motor may include a variator motor input/output (I/O) shaft, which is rotatable about an axis substantially parallel to and offset from the planetary gear system and primary power path axes. Additionally, in certain implementations, the planetary gear system may include: (i) a first sun gear through which the variator input shaft is mechanically coupled to the planetary gear system, and (ii) a first ring gear through which the variator motor is mechanically coupled to the planetary gear system. In certain embodiments, the planetary gear system may also include a second sun gear, which serves as a mechanical output of the planetary gear system; and/or a second ring gear, which is fixedly coupled to the gearbox housing.

Embodiments of a variator gearbox, such as an inline dual planetary variator gearbox, are still further provided. In one embodiment, the variator gearbox includes a gearbox housing into which a variator input shaft extends. The variator input shaft is rotatable with respect to the gearbox housing about a primary power path axis. A planetary gear system is disposed within the gearbox housing and includes a first sun gear, as well as a second sun gear adjacent the first sun gear. The variator input shaft is mechanically coupled to the planetary gear system through the first sun gear. The second sun gear serves as a mechanical output of the planetary gear system. In certain implementations, the first and second sun gears are rotatable about a planetary axis, which is substantially coaxial with the primary power path axis.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures, wherein like numerals denote like elements, and.

DETAILED DESCRIPTION

The following describes one or more example embodiments of the disclosed work vehicle drivetrain and variator assembly, as shown in the accompanying figures of the drawings described briefly above. Various modifications to the example embodiment(s) may be contemplated by one of skill in the art.

As briefly described above, certain work vehicles are equipped with specialized implements powered by a hydrostatic drive through an auxiliary Power Takeoff (PTO) shaft. The ground speed of the work vehicle may be controlled by a separate drivetrain system including a prime mover (e.g., internal combustion engine) and a multi-speed transmission. Such a "dual output" drivetrain provides separate power outputs for the shaft-powered implements and the work vehicle ground wheels in a manner enabling independent speed selection of the implements relative to the ground speed of the vehicle. This advantage notwithstanding, work vehicle drivetrains of this type may be limited in certain respects. For example, such dual output work vehicle drivetrains may require relatively large hydrostatic drives to satisfy the power demands of the shaft-powered implements. As hydrostatic drives tend to be relatively inefficient devices, reliance upon a relatively large hydrostatic drive may reduce overall work vehicle efficiency appreciably in some cases. Additionally, large hydrostatic drive components (e.g., a sizable hydrostatic pump, a high power output hydrostatic motor, associated plumbing, and so on) can add undesired cost, weight, and bulk to the work vehicle drivetrain. Conventional dual output work vehicle drivetrains may rely exclusively upon variations in engine output speed and changes in gear ratio settings of the multi-speed transmission to effectuate desired adjustments in vehicle ground speed. Such work vehicle drivetrains may consequently provide only stepped speed selection (rather than non-stepped or infinite speed selection) within the working ground speed range of the work vehicle.

The following describes embodiments of a highly efficient dual output work vehicle drivetrain well-suited for usage within a work vehicle equipped with shaft-powered implements. As indicated by the term "dual output," the work vehicle drivetrain includes at least two mechanical outputs: (i) a ground wheel output through which the work vehicle is propelled, and (ii) an auxiliary PTO shaft through which shaft-powered implements are driven. In addition to these mechanical outputs, the dual output work vehicle drivetrain also includes a prime mover and a variator motor. In contrast to work vehicle drivetrains of the type described above, the prime mover is utilized to drive rotation of the auxiliary PTO shaft and the shaft-powered implements, while further providing a baseline power output to the ground wheels of the work vehicle. The variator motor likewise contributes a controlled power output to the ground wheel output to further drive the ground wheels over at least a portion the ground speed range of the work vehicle. Such an arrangement allows the size and power requirements of the variator motor (e.g., a hydrostatic drive motor, an electric motor, or another infinitely variable power source) to be reduced as compared to relatively large hydrostatic drives of the type previously described. The overall efficiency of the work vehicle drivetrain is improved as a result. Furthermore, in certain embodiments of the dual output work vehicle drivetrain, the variator motor may be controlled to compensate for, or linearize, the stepped gear ratio settings provided by the multi-speed transmission. In this manner, a non-stepped or infinitely variable power output can be provided for powering the ground wheels over at least a majority and, possibly, over the substantial entirety of the working ground speed range of the work vehicle. Additionally, such a control scheme may allow the prime mover to operate at a substantially constant output speed over the substantial entirety of the working ground speed range to further improve work vehicle efficiency.

Embodiments of the dual output work vehicle drivetrain include a specialized gearbox (referred to herein as a "variator gearbox") through which the variator motor is mechanically linked to the ground wheel output of the work vehicle drivetrain. During drivetrain operation, the variator gearbox sums the power output of the variator motor (POVM) with a fractional power output of the prime mover (PO % PM) and applies this summed power (POVM+PO % PM) to a mechanical output of the gearbox referred to herein as the "primary gearbox output." The variator gearbox may also permit reverse-driving of the variator motor under certain operational conditions, such as during an initial speed range of selected gear ratio settings of the multi-speed transmission. The variator gearbox can contain any number of components, component types, and gearing configurations suitable for performing such functions. It may be particularly advantageously, however, to integrate or incorporate at least one planetary gear system into the variator gearbox. For example, in one embodiment, the variator gearbox may contain a dual planetary gear system rotatable about a planetary axis. The planetary axis may be coaxial or inline with a primary power path axis about which the variator input shaft and the auxiliary PTO shaft rotate. Such a gearbox configuration (referred to hereafter as an "inline dual planetary variator gearbox") usefully provides a structurally robust design, promotes even tooth loading, and helps minimize off-axis disturbance forces. An example of such an inline dual planetary variator gearbox is described more fully below in conjunction with FIGS. 5 and 6. First, however, embodiments of the dual output work vehicle drivetrain are described in conjunction with FIGS. 1-4 to provide an illustrative context in which embodiments of the inline dual planetary variator gearbox may be better understood. While primarily described below in conjunction with a particular type of work vehicle (a harvester), it will be appreciated that embodiments of the inline dual planetary variator gearbox and, more generally, the dual output work vehicle drivetrain can be utilized in conjunction with various other types of work vehicles equipped with shaft-powered implements.

Figure 1:
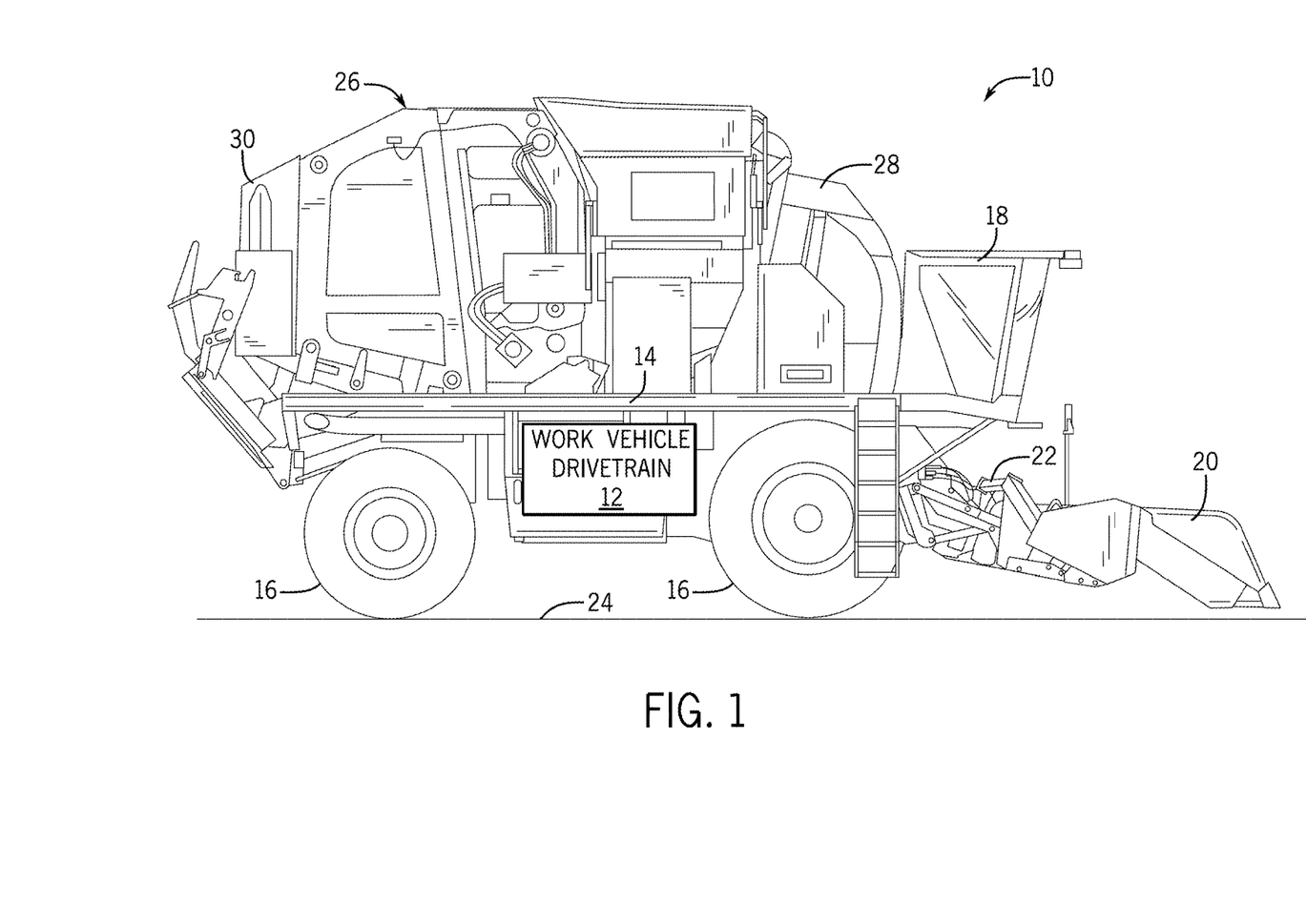
FIG. 1 is a side view of an example work vehicle (specifically, an example cotton stripper) including a dual output work vehicle drivetrain, as illustrated in accordance with an example embodiment of the disclosure.

FIG. 1 is a side view of a cotton harvester 10 containing a dual output work vehicle drivetrain 12, as illustrated in accordance with an example embodiment of the present disclosure. In this particular example, the cotton harvester 10 is depicted as a cotton stripper, but could readily assume the form of a cotton picker or a sugarcane harvester in alternative implementations. The cotton harvester 10 includes a wheeled chassis 14, a number of ground-engaging wheels 16 rotationally mounted to the chassis 14, and an operator cabin 18 supported by a forward portion of the chassis 14. The cotton harvester 10 also includes one or more shaft-powered implements and, specifically, a row of stripper units 20 for collecting cotton fiber as the cotton harvester 10 travels over a cotton field 24. The row of stripper units 20 is mounted to a forward portion of the chassis 14 by a control arm assembly 22. Although only a single stripper unit 20 can be seen in the side view of FIG.

1, the cotton harvester 10 will typically include multiple (e.g., 6 to 8) stripper units arranged in a laterally extending, side-by-side relationship. The individual stripper units each include movable components (e.g., rotating augers or oscillating blades) designed to collect cotton fiber from cotton plants. As the cotton harvester 10 travels across the cotton field 24 and the stripper units 20 gather cotton fiber, a non-illustrating conveyance system (e.g., a pressurized air system) delivers the cotton fiber into a module builder 26 mounted to the chassis 14. The gathered cotton fiber is bundled into a cylindrical bale or "cotton module" as the fiber progress from a forward portion 28 to an aft portion 30 of the module builder 26. The cotton module is then ejected through an opening in the aft portion 30 of the module builder 26 for subsequent collection and transport.

As indicated above, it may be desirable to independently control the operational speed of the stripper units 20 relative to the ground speed of the cotton harvester 10. For example, in one control scheme or operational mode, the stripper units 20 are driven at a substantially constant speed, while the ground speed of the cotton harvester 10 is selectively adjusted by an operator utilizing controls located within the operator cabin 18. In other control schemes or operational modes, the speed of the stripper units 20 may be varied during operation of the work vehicle in response to operator input commands, variations in the work vehicle ground speed, changes in operational parameters of the cotton harvester 10, changes in environmental conditions, and other such factors. The dual output work vehicle drivetrain 12 provides a highly efficient mechanism for powering both the stripper units 20 and the ground wheels 16 of the cotton harvester 10, while further supporting independent speed selection of the stripper units 20 relative to the harvester ground speed. As an additional benefit, embodiments of the dual output work vehicle drivetrain 12 provide a non-stepped or infinitely variable ground speed selection over at least the majority and, perhaps, the substantial entirety of the ground speed range of the cotton harvester 10. One manner in which the dual output work vehicle drivetrain 12 is able to provide such beneficial characteristics will now be discussed in conjunction with FIGS. 2-4.

Figure 2:
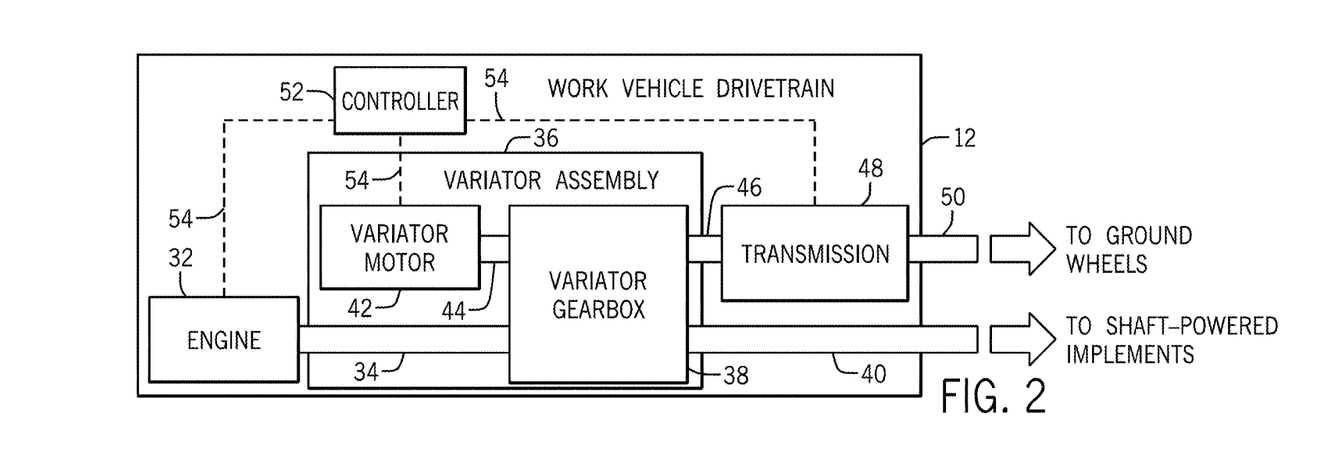
FIG. 2 is a schematic diagram illustrating a first example configuration of the dual output work vehicle drivetrain included in the work vehicle shown in FIG. 1.

Advancing to FIG. 2, an example embodiment of the dual output work vehicle drivetrain 12 is illustrated schematically in greater detail. As can be seen, the work vehicle drivetrain 12 includes a prime mover, such as an engine 32, and a variator assembly or system 36. The prime mover will often assume the form of an internal combustion engine, but can be any motor, engine, or device suitable for converting stored energy (e.g., in the form of liquid fuel) into shaft rotation. A mechanical output of the engine 32 is coupled to a first mechanical input of the variator assembly 36 by way of a rotating mechanical connection 34. Specifically, the variator assembly 36 contains a variator gearbox 38, and the rotating mechanical connection 34 transmits rotary motion to a first mechanical input of the variator gearbox 38. As schematically illustrated in FIG. 2, the rotating mechanical connection 34 may be representative of an output shaft of the engine 32, an input shaft of the variator assembly 36, and/or any number of intervening components suitable for transmitting rotational motion from the mechanical output of the engine 32 to a mechanical input of the variator assembly 36.

The dual output work vehicle drivetrain 12 further contains an auxiliary PTO shaft 40, which extends from the variator gearbox 38. The auxiliary PTO shaft 40 is mechanically coupled to the mechanical output of the engine 32. In one embodiment, the output shaft of the engine 32 may be mechanically linked to the auxiliary PTO shaft 40 in a rotationally-fixed relationship. The mechanical coupling between the output shaft of the engine 32 and the auxiliary PTO shaft 40 can be, for example, a splined coupling located within the variator gearbox 38, as described more fully below in conjunction with FIGS. 5-6. In this case, the output shaft of the engine 32 and the auxiliary PTO shaft 40 rotate in a 1:1 relationship. In other embodiments, the engine output shaft and the auxiliary PTO shaft 40 may be integrally formed as a single piece. Alternatively, the engine output shaft and the auxiliary PTO shaft 40 may be linked through gearing or another rotational coupling such the engine output shaft and the auxiliary PTO shaft 40 rotate in a fixed proportional relationship other than a 1:1 relationship. As indicated in the lower right corner of FIG. 2, the auxiliary PTO shaft 40 serves a final mechanical output of the dual output work vehicle drivetrain 12, which animates the shaft-powered implements of the work vehicle. The auxiliary PTO shaft 40 can be mechanically linked to the work vehicle's shaft-powered implements, such as the stripper units 20 of the cotton harvester 10 shown in FIG. 1, utilizing any suitable mechanical coupling or arrangement.

In addition to the variator gearbox 38, the variator assembly 36 further includes a variator motor 42. The variator motor 42 can be any infinitely variable power source including, but not limited to, an electric motor or a hydrostatic drive motor. A rotating mechanical connection 44 mechanically links the variator motor 42 to the variator gearbox 38. The rotating mechanical connection 44 can be provided by a variator motor shaft projecting from the variator motor 42, by a shaft projecting from the variator gearbox 38, and/or by any number of intervening components suitable for transmitting rotary motion between the respective mechanical inputs and outputs of the variator motor 42 and the variator gearbox 38. In certain embodiments, the variator motor 42 may be capable of being either forward-driven or reverse-driven through the variator gearbox 38, depending upon the operational conditions of the dual output work vehicle drivetrain 12. In embodiments wherein the variator motor 42 can be either forward-driven or reverse-driven, the variator motor may be referred as including a "variator motor input/output (I/O) shaft," while the variator gearbox 38 may be referred to as including a mechanical I/O to which the variator motor I/O shaft is mechanically coupled. Such an arrangement allows excess power supplied by the engine 32 to be absorbed by the variator motor 42 (and other associated devices) in certain regenerative control schemes, as described more fully below. The following description notwithstanding, the variator motor 42 need not accept reverse-driving in all embodiments the work vehicle drivetrain 12.

During operation of the work vehicle drivetrain 12, the variator gearbox 38 functions to sum the power output of the variator motor 42 (POVM) with a fraction of the power output of the engine 32 (PO % PM) drawn from the rotating mechanical connection 34. The power output of the variator motor (POVM) may be considered positive when the variator motor 42 is forward-driven and negative when the variator motor 42 is reverse-driven. The variator gearbox 38 then applies this summed power (POVM+PO % PM) to a multi-speed (e.g., powershift) transmission 48 through a rotating mechanical connection 46. The rotating mechanical connection 46 may be realized in the form of a variator gearbox output (e.g., a rotating shaft, adapter piece, or other mechanical output of the variator gearbox 38), a transmission input shaft, and/or any number of intervening components or devices. When driven through the rotating mechanical connection 46, the multi-speed transmission 48 converts rotation of the primary gearbox output to rotation of a transmission output shaft 50. In the illustrated example, the transmission output shaft 50 serves as the final ground wheel output of the work vehicle drivetrain 12. Accordingly, the transmission output shaft 50 is further mechanically linked to the ground wheels of the work vehicle through additional mechanical connections or devices, which are not shown in FIG. 2 to avoid unnecessary obscuring the drawing.

With continued reference to FIG. 2, the dual output work vehicle drivetrain 12 further includes at least one controller 52. As schematically represented by control lines 54, the controller 52 is operably coupled to the engine 32, to the variator motor 42, and to the transmission 48 in a manner enabling the controller 52 to transmit command signals to and/or receive (e.g., sensor) signals from these components or devices to support operation of the work vehicle drivetrain 12. The control lines 54 may represent hardline or wired connections, wireless signal connections, or a combination thereof. Although illustrated schematically as a single block in FIG. 2, the controller 52 can include or assume the form of any electronic device, subsystem, or combination of devices suitable for performing the processing and control functions described herein. In this regard, the controller 52 may be implemented utilizing any suitable number of individual microprocessors, memories, power supplies, storage devices, interface cards, and other standard components known in the art. Additionally, the controller 52 may include or cooperate with any number of software programs or instructions designed to carry-out various methods, process tasks, calculations, and control functions described herein. The controller 52 may further include or function in conjunction with a memory containing any number of volatile and/or non-volatile memory elements.

During operation of the work vehicle drivetrain 12, the controller 52 commands the variator motor 42 to modify the rotational speed of the variator motor I/O shaft. The controller 52 modifies the output speed of the variator motor 42 to rotate the transmission output shaft 50 at a speed providing a desired output power to the ground wheels and, therefore, a desired ground speed of the work vehicle. The controller 52 may also regulate the speed of the engine 32, or engine speed may be controlled by a separate engine controller. The controller 52 may modify the speed of the variator motor 42 as a function of the engine output speed, the current gear ratio setting of the multi-speed transmission 48, and other operational parameters as appropriate to achieve the desired rotational speed at the transmission output shaft 50. In one embodiment, and by way of non-limiting example only, the controller 52 varies the speed of the variator motor 42 to linearize or, more informally, "smooth out" the stepped gear ratio settings of the multi-speed transmission 48 and thereby yield an infinitely variable power output at the transmission output shaft 50. Stated differently, the controller 52 varies the speed of the variator motor 42 to reduce (and effectively eliminate) stepped changes in the speed of the ground wheel output as the multi-speed transmission 48 transitions between successive gear ratio settings. By executing such a control scheme utilizing the controller 52, an infinite ground speed selection can be provided across the working ground speed range of the work vehicle (e.g., the cotton harvester 10 shown in FIG. 1) despite the inclusion of the multi-speed transmission 48 within the work vehicle drivetrain 12. A non-limiting example of such a control scheme will now be described in greater detail in conjunction with FIG. 3.

Figure 3:
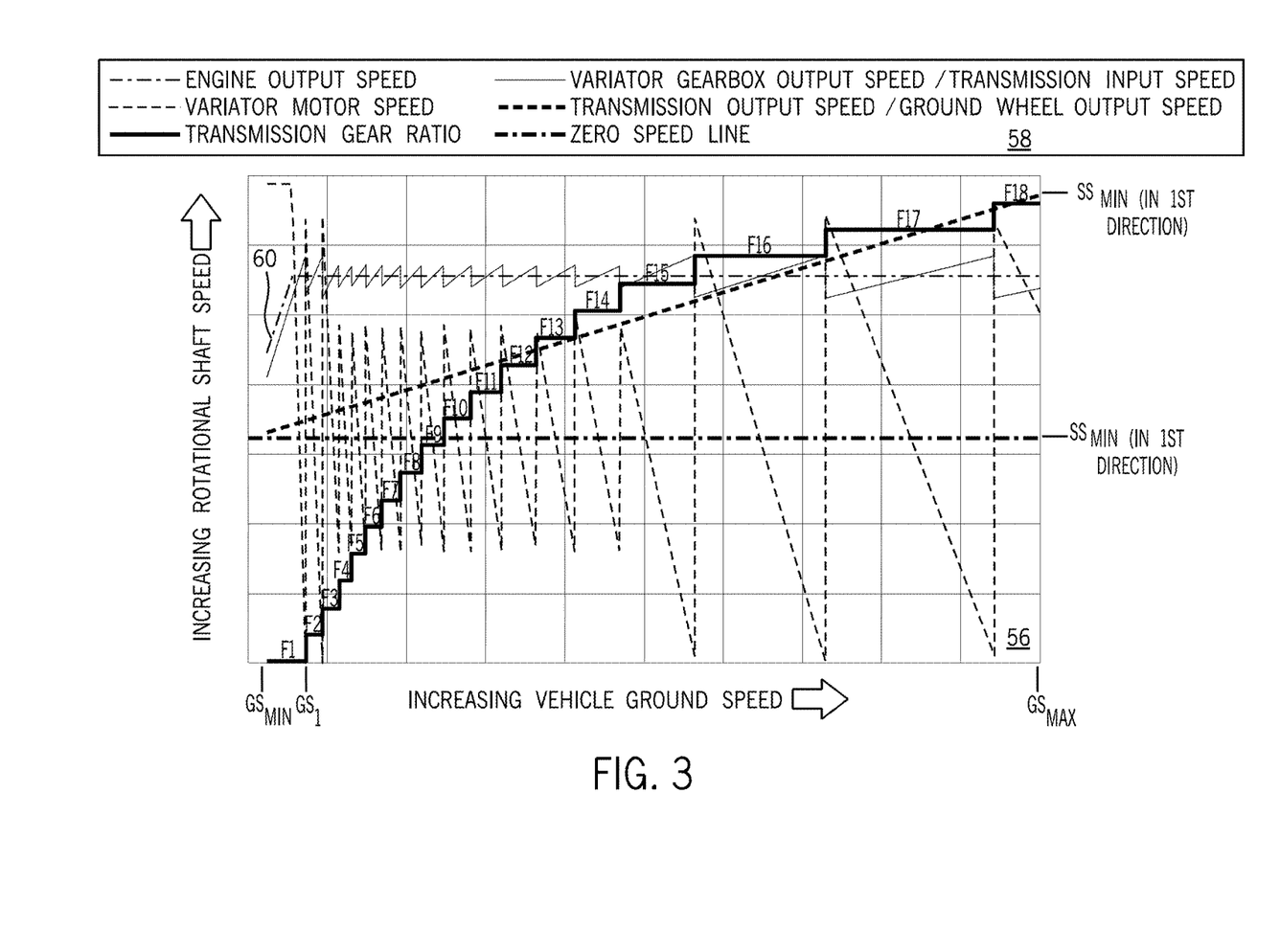
FIG. 3 is a graph of ground speed (abscissa) versus rotational shaft speed (ordinate) illustrating one manner in which the dual output work vehicle drivetrain may provide a non-stepped or infinitely variable power output over the ground speed range of a work vehicle in an embodiment.

FIG. 3 is a graph 56 illustrating a control scheme that can be carried-out by the controller 52 of the dual output work vehicle drivetrain 12 (FIG. 2) in a further example embodiment of the present disclosure. Increasing work vehicle ground speed is plotted along the abscissa or horizontal axis of the graph 56, while increasing shaft speed is plotted along the ordinate or vertical axis thereof. Several traces or characteristics are plotted on the graph 56. As labeled in a key 58 appearing in an upper portion of FIG. 3, these traces or characteristics include: (i) an engine output speed characteristic, (ii) a variator motor speed characteristic, (iii) a variator gearbox output speed characteristic (also representative of the transmission input speed in the embodiment of FIGS. 2-3), and (iv) a transmission output speed characteristic (also representative of the final ground wheel power output in the embodiment of FIGS. 2-3). As further identified in the key 58, the stepped line overlaid onto the graph 56 represents the discrete gear ratio settings of the multi-speed transmission 48. In this particular example, the multi-speed transmission 48 is a powershift transmission including eighteen gear ratio settings, which are identified as "F1-F18." In other embodiments, the number of gear ratio settings provided by the transmission 48 and the relative characteristic of the gear ratio settings may vary. Finally, the dashed vertical line extending across a mid-portion of the graph represents the zero speed line. Below the zero speed line, the appearance of the variator motor speed characteristic denotes reverse-driving of the variator motor 42 (FIG. 2).

As expressed in the graph 56 shown in FIG. 3, the transmission output speed characteristic is represented by a linear trace having a positive slope, which is substantially constant over the graphed vehicle ground speed range. The transmission output speed characteristic progresses in a relatively gradual or non-stepped manner from a minimum shaft speed (identified as "SSMIN"; approximately zero) to a maximum shaft speed (identified as "SSMAX"), as taken in a first rotational direction corresponding to forward motion of the work vehicle. A non-stepped or infinitely variable power output is consequently provided over the speed selection for transmission output speeds between SSMIN and SSMAX. As the transmission output speed corresponds to the speed of the primary gearbox output in the embodiment of FIGS. 2-3, this likewise provides a non-stepped or infinitely variable power output over the ground speed range of the work vehicle. In the example of FIG. 3, the ground speed range of the work vehicle ranges from a minimum ground speed (identified as "GSMIN") to a maximum ground speed (identified as "GSMAX"), exclusive of any reverse gear settings. In one embodiment, the ground speed range of the work vehicle is 0 to 20 mile per hour (MPH) such that GSMIN=0 MPH, while GSMAX=20 MPH. In other embodiments, the ground speed range of the work vehicle may be greater than or less than the aforementioned range.

The infinitely variable power output provided at the transmission output shaft 50 (FIG. 1) is achieved despite the discrete, stepped gear ratio settings of the multi-speed transmission 48. This is due, in part, to the manner in which the variator gearbox 38 applies to the multi-speed transmission 48 (FIG. 2) the power output of the variator motor 42 as summed with a fractional power output of the engine 32. Additionally, in accordance with the example control scheme shown graphically in FIG. 3, the controller 52 modulates the speed of the variator motor 42 in a manner compensating for and effectively linearizing the stepped speed output of the transmission 48. This may be appreciated by comparing the relationship between the stepped gear ratio settings F2-F18 of the multi-speed transmission 48 relative to the variator motor output speed over the working ground speed range of the work vehicle. As can be seen, the variator motor 42 first accepts reverse-driving over an initial portion (a lower ground speed range) of each gear ratio setting F2-F18. When reverse-driven in this manner, the variator motor 42 (and other associated components) is advantageously configured to absorb the excess power output drawn from the engine 32 (PO % PM) through the rotating mechanical connection 34 (FIG. 2) to allow the work vehicle drivetrain to temporarily operate in a regenerative state. In this regard, the variator motor 42 (and other associated components) may convert the rotary movement transmitted to the motor 42 to electrical energy, which is then stored or later utilized to optimize the efficiency of the work vehicle drivetrain 12. As the work vehicle ground speed increases toward a latter portion (a higher ground speed range) of each gear ratio setting F2-F18, the controller 52 (FIG. 2) controls the variator motor 42 to gradually increase or "ramp-up" the output speed of the variator motor I/O shaft. A substantially linear, infinitely variable power output is consequently produced over the operational range of the work vehicle drivetrain 12.

In certain embodiments of the work vehicle drivetrain 12, the engine 32 may provide a substantially constant speed output over the majority of the ground speed range of the work vehicle. In this regard, and as further indicated in the graph 56 (FIG. 3), the engine 32 can be controlled to provide a substantially constant output speed over the substantial entirety of the working ground speed range from a first relatively low ground speed (identified as "GS1" in FIG. 3) to a second higher speed (equivalent to GSMAX in FIG. 3). In one embodiment, and by way of non-limiting example only, GS1 may be approximately 1 MPH. At vehicle ground speeds exceeding GS1, the linear nature of the ground wheel output characteristic may be created by controlling the variator motor 42 in relation to the gear ratio settings of the multi-speed transmission 48 (F2-F18) in the previously-described manner. Conversely, at ground speeds below GS1, the transmission 48 remains at a single gear ratio setting (F1), and the linear nature of the ground wheel output characteristic is achieved simply by varying the output speed of the engine 32 (FIG. 2), as indicated by an initial segment 60 of the engine output speed characteristic. The variator motor 42 may contribute to a substantially constant power output during this initial ground speed range (GSMIN to GS1). In other embodiments, a different control scheme may be implemented utilizing the dual output work vehicle drivetrain 12 (FIG. 2) such that the output speed of the variator motor 42 may be modulated over a greater or lesser portion of the working ground speed range of the work vehicle.

By maintaining the engine output speed at a substantially constant speed over the majority and, perhaps, over the substantial entirety of the work vehicle's working ground speed range, the efficiency of the dual output work vehicle drivetrain 12 can be enhanced, while control scheme complexity is reduced. In other embodiments, the engine speed may not be held substantially constant across the working ground speed range of the work vehicle. In either case, the variator motor 42 need only provide a relatively modest power contribution, as appropriate to transform the stepped gear ratios of the transmission 48 into a substantially linear, infinitely variable power output over the majority of the ground speed range of the work vehicle. The operational requirements (e.g., power demands) placed on the variator motor 42 are thus minimized, which allows the variator motor size, weight, and inefficiency contributions to be reduced. Thus, even when assuming the form of a hydrostatic drive motor, the variator motor size can be minimized as compared to relatively large hydrostatic drive motors of the type conventionally utilized within dual output work vehicle drivetrains. The efficiency of the dual output work vehicle drivetrain 12 is improved as a result, while the cost, size, and complexity of drivetrain 12 are reduced. The foregoing example notwithstanding, the output speed of the variator motor 42 may be controlled in a different manner in further embodiments of the work vehicle drivetrain 12. For example, in an alternative embodiment, the output speed of the variator motor 42 may be controlled such that the ground wheel power output of the work vehicle drivetrain 12 is linearized over only a portion of the working ground speed range of the work vehicle.

There has thus been described an example embodiment of a highly efficient dual output work vehicle drivetrain well-suited for incorporation into work vehicles equipped with shaft-powered implements, such as cotton and sugarcane harvesters. The above-described dual output work vehicle drivetrain is provided by way of non-limiting example only. Various modifications can be made to the work vehicle drivetrain without departing from the scope of the invention, as set-forth in the appended Claims. For example, in the embodiment of the work vehicle drivetrain 12 shown in FIG. 2 the variator gearbox 38 is positioned mechanically upstream of the multi-speed transmission 48; however, this need not be the case in all embodiments. Instead, in further embodiments, the variator gearbox may be positioned mechanically downstream of the multi-stepped transmission. In this case, the primary gearbox output (rather than the output shaft of the multi-speed transmission) may serve as the final ground wheel output of the work vehicle drivetrain. An example of such an alternative implementation of the work vehicle drive train will now be described more fully below in conjunction with FIG. 4.

Figure 4:
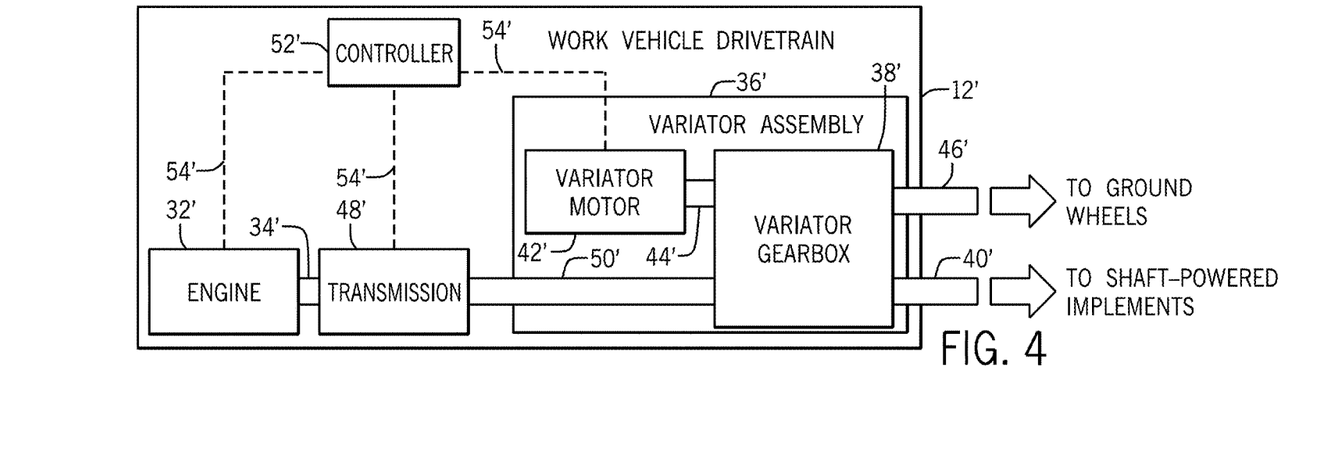
FIG. 4 is a schematic diagram illustrating a second example configuration of the dual output work vehicle drivetrain included in the work vehicle shown in FIG. 1.

FIG. 4 illustrates schematically a dual output work vehicle drivetrain 12', as depicted in accordance with a further example embodiment of the present disclosure. The dual output work vehicle drivetrain 12' is similar to the dual output work vehicle drivetrain 12 shown in FIG. 2; thus, like reference numerals are utilized to denote like structural features or devices, but with the addition of a prime (') symbol to indicate that such features or devices may vary to certain extents. As was previously the case, the work vehicle drivetrain 12' includes a variator assembly 36' containing a variator gearbox 38', a variator motor 42', and a rotating mechanical connection 44' mechanically linking the variator gearbox 38' to the I/O shaft of the variator motor 42'. An auxiliary PTO shaft 40' projects from the variator gearbox 38' and serves as a first mechanical output of the dual output work vehicle drivetrain 12' for driving the shaft-powered implements. Once again, the variator gearbox 38' is mechanically coupled in series with an engine 32' and a multi-speed transmission 48'. However, in this particular example, the variator gearbox 38' is positioned mechanically downstream of the multi-speed transmission 48'. Specifically, the variator gearbox 38' is mechanically linked to the multi-speed transmission 48' by a rotating mechanical connection, which may be representative of an output shaft of the transmission 48', an input shaft of the variator gearbox 38', and/or any number of intervening components or connections. Additionally, the output shaft of the variator gearbox 38' (rather than the output shaft of the transmission 48) now serves as the final primary gearbox output of the work vehicle drivetrain 12'. These differences notwithstanding, the output speed of the variator motor 42' can still be controlled (e.g., by issuing appropriate commands from the controller 52') in essentially the same manner as described above in conjunction with FIG. 3, if so desired. In particular, the output speed of the variator motor 42' can be controlled to transform the discrete, stepped gear ratio settings of the multi-speed transmission 48' into a non-stepped, infinitely variable power output (as applied to the primary gearbox output 46') for driving the work vehicle ground wheels.

Multiple example embodiments of a highly efficient work vehicle drivetrain have been provided, which enable independent ground speed selection of a work vehicle (e.g., over an infinitely selectable ground speed range) relative to the speed of one or more shaft-powered implements carried by the work vehicle. In each of the above-described example embodiments, the work vehicle drivetrain utilized a variator gearbox to mechanically sum the power output of a variator motor with a fractional power output of a primary engine and then apply this summed power to an output shaft of the gearbox. As previously emphasized, the variator gearbox can assume various different forms and contain a wide variety of gearing combinations suitable for performing such functions. Certain benefits may be achieved, however, through the usage of a variator gearbox containing an "inline" planetary gear system; that is, a planetary gear system rotatable about an axis that is substantially coaxial or inline with the primary power path axis about which the variator output shaft and the auxiliary PTO shaft rotate. In one embodiment, the variator gearbox contains an inline dual planetary gear system architecture; that is, gearing containing two planetary gear systems that rotate about a common axis, which is substantially coaxial or inline with the primary power path axis about which the auxiliary PTO shaft and the variator output shaft rotate. An example of such an inline dual planetary variator gearbox will now be described in conjunction with FIGS. 5 and 6.

Figure 5:
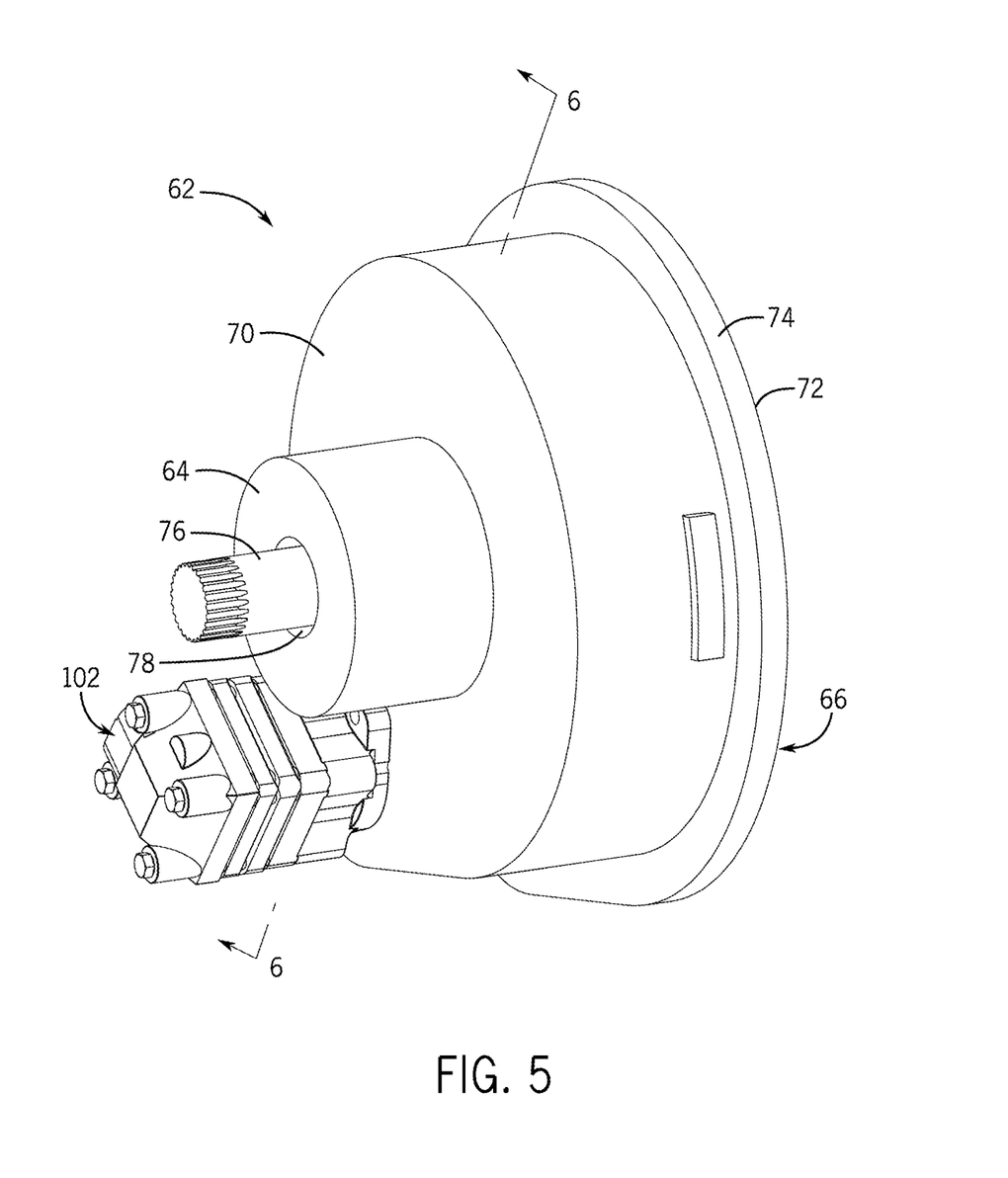
FIGS. 5 and 6 are isometric and cross-sectional views, respectively, of an inline dual planetary variator gearbox, which may be included in embodiments of the dual output work vehicle drivetrain shown in FIGS. 2 and 4 and which is illustrated in accordance with a further example embodiment of the present disclosure.
Figure 6:
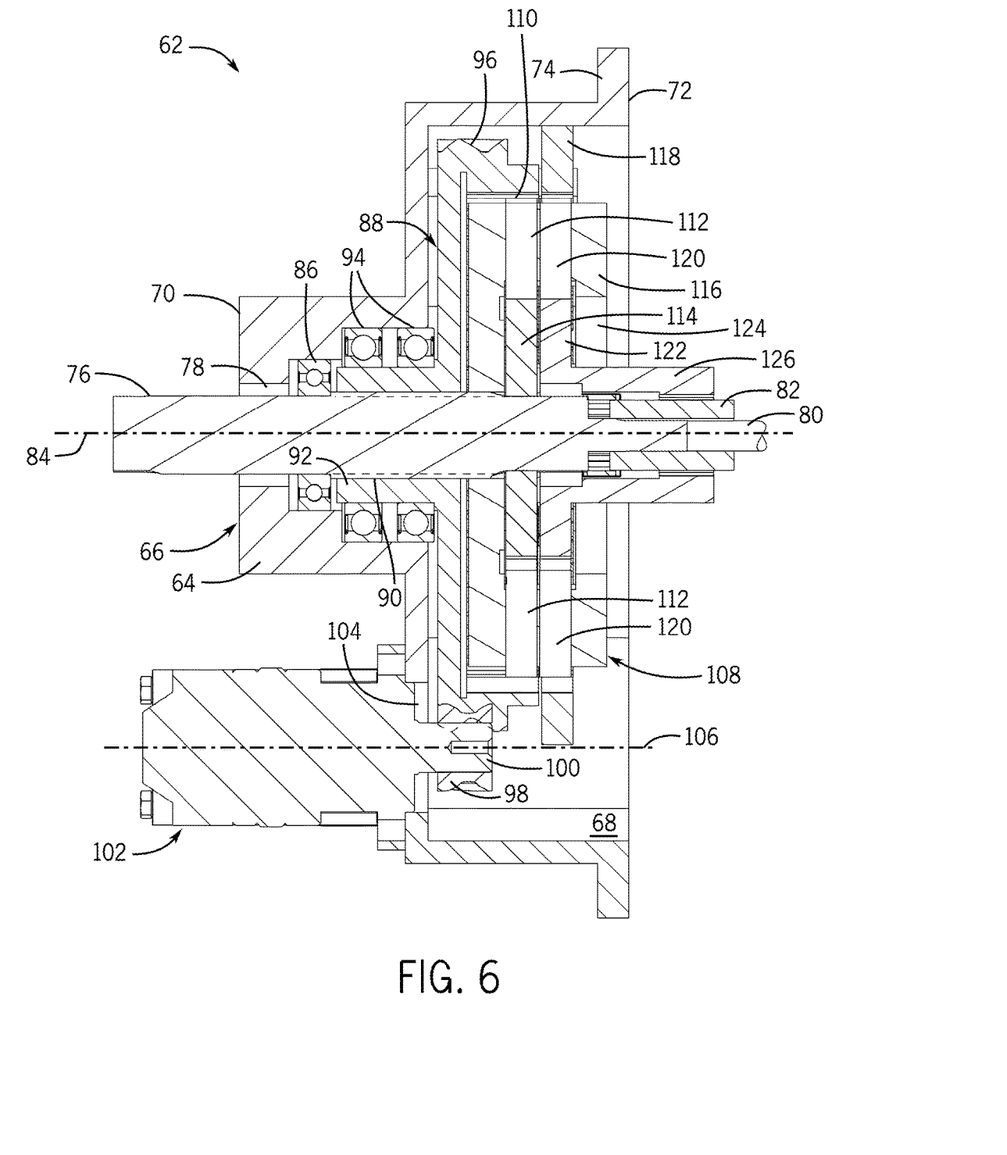

FIGS. 5 and 6 are isometric and cross-sectional views, respectively, of an inline dual planetary variator gearbox 62, as illustrated in accordance with a further example embodiment of the present disclosure. The inline dual planetary variator gearbox 62 is well-suited for usage as the variator gearbox 38 of the work vehicle drivetrain 12 described above in conjunction with FIG. 2 and will consequently be described below with occasional reference to the work vehicle drivetrain 12. This notwithstanding, it will be appreciated that the following description is provided by way of non-limiting example only and that the inline dual planetary variator gearbox 62 can be utilized within other types of dual output work vehicle drivetrains. Referring jointly to FIGS. 6 and 7, the inline dual planetary variator gearbox 62 includes a gearbox housing 66 having an inner compartment or cavity 68 (FIG. 6), a first side 70, and a second opposing side 72. An opening is provided in the second side 72 of the gearbox housing 66 permitting physical access to the gearbox housing cavity 68 prior to installation of the inline dual planetary variator gearbox 62 within a work vehicle drivetrain. A radial flange 74 extends around the second side of the gearbox housing 66 to allow the inline dual planetary variator gearbox 62 to be bolted to otherwise attached to another structure, such as the housing of a multi-speed transmission. In the illustrated example, the gearbox housing 66 has a generally cylindrical, drum-like geometry and may be produced as a single (e.g., cast and machined) part. In further embodiments, the gearbox housing 66 may have a different form factor and/or may be produced from multiple components, which are joined together in any manner suitable for supporting the various components of the variator gearbox 62.

A variator input shaft 76 extends into the gearbox housing 66 through an opening 78 provided in the first side 70 thereof. A first end portion of the variator input shaft 76 is accessible from the exterior of the gearbox housing 66 and may be mechanically linked (either directly or through any number of intervening components) to the output of a primer. For example, in the case of the previously-described work vehicle drivetrain 12 (FIG. 2), the first end portion of the variator input shaft 76 can be coupled to the output shaft of the engine 32 in a rotationally-fixed manner. As shown most clearly in FIG. 5, the first end portion of the variator shaft 76 may have a splined outer surface to facilitate such a rotationally-fixed coupling.

As shown most clearly in FIG. 6, a second, opposing end portion of the variator input shaft 76 is fixedly coupled to an auxiliary PTO shaft 80 via a splined connector 82 contained within the gearbox housing 66. As a result of this coupling, the variator input shaft 76 and the auxiliary PTO shaft 80 co-rotate about a common axis as represented by dashed line 84 (FIG. 6) and referred to hereafter as the "primary power path axis 84." Collectively, the variator input shaft 76 and the auxiliary PTO shaft 80 form a dedicated mechanical path for transmitting rotary motion through the variator gearbox 62 from the drivetrain's primary mover (e.g., engine 32 shown in FIG. 2 or engine 32' shown in FIG. 4) to the shaft-powered implements carried by the work vehicle. It will be noted, however, that a certain fraction of the rotary power transmitted along this mechanical path is drawn from the variator input shaft 76 during operation the inline dual planetary variator gearbox 62, as described more fully below. To facilitate rotation of the variator input shaft 76 and the auxiliary PTO shaft 80 about the primary power path axis 84, any number of bearings and other support members may be provided within the inline dual planetary variator gearbox 62. For example, as shown in FIG. 6, one or more ball bearings 86 may be disposed around the variator input shaft 76 and within a cylindrical-extension or boss of gearbox housing 66 through which the variator input shaft 76 extends.

A drum-shaped rotatable part or member 88 (hereafter "rotatable drum 88") is further disposed within the gearbox housing 66 for rotation about the primary power path axis 84. The rotatable drum 88 includes a tubular projecting or extension 92 through which a central opening or longitudinal channel 90 extends. The variator input shaft 76 extends through the longitudinal channel 90 of the rotatable drum 88, which extends around or circumscribes the variator input shaft 76. The rotatable drum 88 is rotatable relative to the variator input shaft 76 about the primary power path axis 84. A number of ball bearings 92 are piloted to or disposed around the tubular extension 92 to facilitate rotation of the rotatable drum 88 about the primary power path axis 84. A toothed circumferential surface 96 is further provided around an outer perimeter of the rotatable drum 88. As can be seen in a lower portion of FIG. 6, the toothed circumferential surface 96 forms as an outer gear, such as a spur gear, which meshes with a pinion gear 98 further contained within the gearbox housing 66. The pinion gear 98 is, in turn, mounted to a variator motor I/O shaft 100 in a rotationally-fixed manner. The variator motor I/O shaft 100 projects from a variator motor 102, which is affixed to the first side 68 of the gearbox housing 66 in a cantilevered mounting. The variator motor I/O shaft 100 extends through an opening 104 in a wall of the variator gearbox housing 66 and into the inner cavity 68 in which the below-described dual planetary gear system 108 is disposed. The variator motor I/O shaft is rotatable about a secondary rotational axis 106, which is parallel to and offset from the primary power path axis 84 about which the variator input shaft 76 and the auxiliary PTO shaft 80 rotate.

As indicated above, a dual planetary gear system 108 is further contained within the inner cavity 68 of the gearbox housing 66. The dual planetary gear system 108 includes, in part, a first ring gear 110, a first set of planetary gears 112, and a first sun gear 114. In the instant example, the first ring gear 110 is formed along an inner circumferential surface or an inner perimeter of a cylindrical portion of the rotatable drum 88. The first ring gear 110 engages the first set of planetary gears 112, which, in turn, engage the first sun gear 114. The first set of planetary gears 112 is angularly spaced about the first sun gear 114 and supported by a carrier 116. Additionally, the first sun gear 114 is mounted to the variator gearbox input shaft 76 in a rotationally-fixed relationship utilizing, for example, a splined interface. Collectively, the first ring gear 110, the first set of planetary gears 112, and the first sun gear 114 form a first planetary gear subsystem 110, 112, 114 of the dual planetary gear system 108.

In addition to the first planetary gear subsystem 110, 112, 114, the dual planetary gear system 108 further contains a second planetary gear subsystem 118, 120, 122. With continued reference to FIG. 6, the second planetary gear subsystem 118, 120, 122 includes a second ring gear 118, a second set of planetary gears 120, and a second sun gear 122. Once again, the second ring gear 118 meshes with the second set of planetary gears, which, in turn, mesh with the sun gear 122. However, in the case of second planetary gear subsystem 118, 120, 122, the second ring gear 118 is affixed to the gearbox housing 66 in a mechanically-grounded manner. Consequently, the second ring gear 118 is a static component, which does not rotate in conjunction with the other components of the dual planetary gear system 108. In further embodiments, the rotation of the second ring gear 118 may be selectively restricted or regulated utilizing a suitable brake or clutch pack arrangement.

The second set of planetary gears 120 is supported by the same carrier 116 supporting the first set of planetary gears 112. The carrier 116 is thus referred to as "common carrier 116" hereafter. In addition to supporting both sets of planetary gears 112, 120, the common carrier 116 is also partially nested within the larger rotatable drum 88. The common carrier 116, in turn, includes a central cavity 124 in which the first and second sun gears 114, 122 are nested. By nesting the sun gears 114, 122 within the common carrier 116 in this manner, the weight and envelope of the dual planetary gear system 108 (particularly the axial dimension of the gear system 108) can be favorably reduced. The second set of planetary gears 120 is angularly spaced about the primary power path axis 84 and engages the second ring gear 118. The second sun gear 122, circumscribes the variator input shaft 76 and is rotatable with respect thereto about the primary power path axis 84. The second sun gear 122 further engages the second set of planetary gears 120 and serves as a mechanical output of the dual planetary gear system 108.

A tubular adapter piece 126 further serves as the primary gearbox output of the inline dual planetary variator gearbox 62. The tubular adapter piece 126 projects from the gearbox housing 66 in a direction opposite the variator inputs shaft 76 and is mechanically coupled to the second sun gear 122 in a rotationally-fixed manner. If desired, the second sun gear 122 and the tubular adapter piece 126 can integrally formed as a single piece as indicated in FIG. 6; however, this need not be the case in all embodiments. When the inline dual planetary variator gearbox 62 is installed within a work vehicle drivetrain, the tubular adapter piece 126 is further mechanically linked (e.g., via a splined connection) to another rotating component or shaft (not shown in FIG. 6). The rotating shaft to which tubular adapter piece 126 is linked may serve as the final ground wheel output of the work vehicle drivetrain or may instead provide a power input to another component included within the work vehicle drivetrain, such as the multi-speed transmission 48 of the work vehicle drivetrain 12 shown in FIG. 2.

By virtue of the above-described gear arrangement, the variator input shaft 76 is mechanically coupled to the dual planetary gear system 108 through the first sun gear 114. The first sun gear 114 thus serves as a first mechanical input of the dual planetary gear system 108 and, more generally, of the inline dual planetary variator gearbox 62. The first ring gear 110 further serves as a second mechanical input (and mechanical output) of the dual planetary gear system 108; as previously noted, the I/O shaft 100 of the variator motor 102 is mechanically linked to the dual planetary gear system 108 through the first ring gear 110 and, therefore, the rotatable drum 88. When the variator motor 102 is forward-driven, rotation of the dual planetary gear system 108 is powered by both the variator motor 102 (again, acting through the first ring gear 110) and the prime mover (acting through the variator input shaft 76 and the first sun gear 114). As the first ring gear 110 and the first sun gear 114 rotate about the primary power path axis 84, so too does the first set of planetary gears 112 and the common carrier 116. Rotation of the common carrier 116 drives rotation of the second set of planetary gears 120, which travel along the interior of the fixed second ring gear 118 and impart rotary motion to the second sun gear 122.

The second sun gear 122 serves as the primary mechanical output of the dual planetary gear system 108, which provides a power output to the work vehicle ground wheels through the tubular adapter piece 126 as previously described. In this manner, the dual planetary gear system 108 sums the power input received at the first ring gear 110 (POVM) with the power input received at the first sun gear 114 (PO % PM) and applies this summed power to the work vehicle ground wheels through the second sun gear 122. A first relatively high gear ratio (GR1) is advantageously provided between the mechanical input into which the variator motor 102 drives (the first ring gear 110 in the illustrated example) and the mechanical output of the dual planetary gear system 108 (the second sun gear 122), and a second relatively high gear ratio (GR2) may be provided between the mechanical input into which the engine drives (the first sun gear 114 in the illustrated example) and the second sun gear 122, with the first gear ratio being greater than the first gear ratio (GR1>GR2).

When the variator motor 102 is reverse-driven, the excess power drawn from the prime mover (e.g., the engine 32 shown in FIG. 2) through the variator input shaft 76 (PO % PM) is returned to the variator motor 102 via the dual planetary gear system 108. Specifically, the excess power drawn through the variator input shaft 76 is transmitted to the first ring gear 110 (and, more generally, the rotatable drum 88) through the first set of planetary gears 112. Rotation of the rotatable drum 88 then drives rotation of the variator motor I/O shaft 100 through the pinion gear 98. The motion imparted to the variator motor 102 is then temporary converted to stored energy, which can be subsequently utilized when the motor 102 is again operated in a forward-driven mode. The inline dual planetary variator gearbox 62 permits such reverse-driving of the variator motor 102 and, thus, a regenerative functionality of the work vehicle drivetrain under certain operational conditions. For example, the inline dual planetary variator gearbox 62 may permit reverse-driving of the variator motor 102 during an initial speed range of selected gear ratio settings of a multi-speed transmission, such as the multi-speed transmission 48 included in the work vehicle drivetrain 12 shown in FIG. 2. This advantageously allows the work vehicle drivetrain to provide a non-stepped or infinitely variable power output to the ground wheels despite the inclusion of a stepped, multi-speed transmission within the drivetrain. As a further advantage, the inline dual planetary gearbox 62 provides structurally robust design, which promotes even tooth loading and helps minimize off-axis disturbance forces during drivetrain operation.

There has thus been provided multiple example embodiments of a highly efficient dual output work vehicle drivetrain, which is well-suited for cotton harvesters, sugarcane harvesters, and other work vehicles equipped with shaft-powered implements. In the above-described embodiments of the dual output work vehicle drivetrain, a prime mover (e.g., an engine) is utilized to drive rotation of an auxiliary PTO shaft and the shaft-powered implements, while further providing a baseline power output to the work vehicle ground wheels through a ground wheel output. A variator assembly, which includes a variator motor and a variator gearbox, contributes a controlled power output to the ground wheel output of the work vehicle over at least a portion the vehicle's working ground speed range. Such an arrangement advantageously allows the size and power requirements of the variator motor to be minimized to improve overall work vehicle efficiency. Additionally, in certain embodiments wherein the work vehicle drivetrain contains a multi-speed transmission, the dual output work vehicle drivetrain may be configured to at least partially compensate for the stepped nature of the transmission gear ratio settings and thereby yield an infinitely variable power output for powering the ground wheels over at least a majority and, possibly, the substantial entirety of the working ground speed range of the work vehicle. Embodiments of an inline (e.g., dual) planetary variator gearbox advantageously utilized within the dual output work vehicle drivetrain have also been disclosed.

While at least one example embodiment has been presented in the foregoing Detailed Description, it should be appreciated that a vast number of variations exist. It should also be appreciated that the example embodiment or example embodiments are only examples, and are not intended to limit the scope, applicability, or configuration of the invention in any way. Rather, the foregoing Detailed Description will provide those skilled in the art with a convenient road map for work implementing an example embodiment of the invention. It being understood that various changes may be made in the function and arrangement of elements described in an example embodiment without departing from the scope of the invention as set-forth in the appended claims.

What is claimed is:

1. A work vehicle drivetrain, comprising:
   an engine;
   an auxiliary power takeoff (PTO) shaft coupled to the engine and rotatable about a primary power path axis when driven by the engine to drive a shaft-powered implement coupled to the work vehicle; and
   a variator assembly, comprising:
      a variator motor;
      a variator gearbox containing a planetary gear system coupled to the variator motor and to the auxiliary PTO shaft, the planetary gear system being rotatable about a planetary axis coaxial with the primary power path axis of the auxiliary PTO shaft; and
      a variator input shaft through which the engine is mechanically coupled to the planetary gear system;
      wherein the planetary gear system comprises a first sun gear rotationally fixed to the variator input shaft and a second sun gear adjacent the first sun gear and providing a mechanical output of the variator gearbox.

2. The work vehicle drivetrain of claim 1, wherein the variator motor has an output shaft rotatable about an axis substantially parallel to and offset from the planetary and primary power path axes.

3. The work vehicle drivetrain of claim 1, wherein planetary gear system comprises a dual planetary gear system.

4. The work vehicle drivetrain of claim 1, wherein the auxiliary PTO shaft is coupled to the variator input shaft in a rotationally-fixed relationship.

5. The work vehicle drivetrain of claim 1 further comprising a carrier within which the first and second sun gears are at least partially nested.

6. The work vehicle drivetrain of claim 1, wherein the planetary gear system further comprises a first ring gear through which the variator motor is mechanically coupled to planetary gear system.

7. The work vehicle drivetrain of claim 6, wherein the planetary gear system further comprises:
   a variator gearbox housing; and
   a second ring gear fixedly coupled to the variator gearbox housing.

8. The work vehicle drivetrain of claim 1, further comprising a primary gearbox output at which the planetary gear system applies a power output of the variator motor summed with at least a portion of a power output of the engine.

9. The work vehicle drivetrain of claim 1, wherein the work vehicle drivetrain is configured to be deployed onboard a work vehicle having a working ground speed range, and wherein the work vehicle further comprises:
   a transmission having a plurality of stepped gear ratio settings; and
   a controller operably coupled to the engine, to the transmission, and to the variator motor, the controller configured to control the variator motor to at least partially linearize the stepped gear ratio settings of the transmission.

10. The work vehicle drivetrain of claim 1, wherein the variator assembly includes a variator gearbox housing; and wherein the planetary gear system includes:
    a first ring gear through which the variator motor is mechanically coupled to the planetary gear system; and
    a second ring gear fixedly coupled to the variator gearbox housing.

11. A variator assembly, comprising:
    a variator motor; and
    a variator gearbox, comprising:
       a gearbox housing to which the variator motor is mounted;
       a variator input shaft extending into the gearbox housing and rotatable with respect thereto about a primary power path axis; and
       a planetary gear system disposed within the gearbox housing, coupled to the variator motor and to the variator input shaft, and rotatable about a planetary axis substantially coaxial with the primary power path axis, wherein the planetary gear system comprises:

a first sun gear through which the variator input shaft is mechanically coupled to the planetary gear system;

a first ring gear through which the variator motor is mechanically coupled to the planetary gear system;

a second sun gear providing a mechanical output of the planetary gear system; and a second ring gear fixedly coupled to the gearbox housing.

12. The variator assembly of claim 11, wherein the variator motor comprises a variator motor input/output (I/O) shaft rotatable about an axis substantially parallel to and offset from the planetary gear system and primary power path axes.

13. A variator gearbox, comprising:

a gearbox housing;

a variator input shaft extending into the gearbox housing and rotatable with respect thereto about a primary power path axis; and a planetary gear system disposed within the gearbox housing, the planetary gear system comprising:

a first sun gear through which the variator input shaft is mechanically coupled to the planetary gear system;

a second sun gear adjacent the first sun gear and providing a mechanical output of the planetary gear system;

a first ring gear through which a variator motor is mechanically coupled to the planetary gear system; and a second ring gear fixedly coupled to the gearbox housing.

14. The variator gearbox of claim 13, wherein the first sun gear and the second sun gear are rotatable about a planetary axis, which is substantially coaxial with the primary power path axis.

15. The variator gearbox of claim 13, further comprising:

a first set of planetary gears engaging the first sun gear;

a second set of planetary gears engaging the second sun gear; and a common carrier supporting the first set of planetary gears, supporting the second set of planetary gears, and having a cavity within which the first and second sun gears are at least partially nested.

* * * * *

UNITED STATES PATENT AND TRADEMARK OFFICE
CERTIFICATE OF CORRECTION

PATENT NO. : 10,190,662 B2
APPLICATION NO. : 15/214333
DATED : January 29, 2019
INVENTOR(S) : Watt et al.

Page 1 of 1

It is certified that error appears in the above-identified patent and that said Letters Patent is hereby corrected as shown below:

In the Claims

In Column 16, Line 14, in Claim 3, delete "wherein planetary" and insert -- wherein the planetary --, therefor.

In Column 16, Line 20, in Claim 5, delete "claim 1" and insert -- claim 1, --, therefor.

Signed and Sealed this
Seventh Day of May, 2019

Andrei Iancu
*Director of the United States Patent and Trademark Office*